United States Patent

[11] 3,572,846

[72] Inventor Oliver B. Cruse
 Florissant, Mo.
[21] Appl. No. 879,858
[22] Filed Nov. 25, 1969
 Division of Ser. No. 771,559, Oct. 29, 1968.
[45] Patented Mar. 30, 1971
[73] Assignee Wagner Electric Corporation
 Newark, N.J.

[54] CONTROL VALVE
 11 Claims, 3 Drawing Figs.
[52] U.S. Cl. .................................................. 303/9,
 303/2, 303/13, 303/52, 303/54, 303/71
[51] Int. Cl. ........................................ B60t 13/38,
 B60t 13/28
[50] Field of Search........................................ 303/2, 7, 9,
 13, 52—54, 40, 68—69, 71

[56] References Cited
UNITED STATES PATENTS
3,188,916 6/1965 Beatty........................... 303/71UX

| | | | |
|---|---|---|---|
| 3,285,672 | 11/1966 | Aurea............................ | 303/9 |
| 3,385,636 | 5/1968 | Cruse ............................ | 303/13X |
| 3,410,610 | 11/1968 | Cumming..................... | 303/9 |
| 3,479,096 | 11/1969 | Cruse ............................ | 303/13X |

Primary Examiner—Milton Buchler
Assistant Examiner—John J. McLaughlin
Attorney—Joseph E. Papin ABSTRACT: A control valve having a service member for applying service fluid pressure to the service portion of a spring set brake device to normally effect service energization of a brake connected therewith and an emergency member actuated by said service member in the event of the failure of the service fluid pressure for venting emergency fluid pressure normally applied to the emergency portion of said spring set brake device to the atmosphere to effect mechanical emergency energization of said brake, and a resilient member responsive to emergency fluid pressure less than a predetermined value for automatically isolating the emergency fluid pressure supply and venting the emergency fluid pressure applied to the emergency portion of said spring set brake device to the atmosphere.

PATENTED MAR 30 1971

3,572,846

INVENTOR
OLIVER B. CRUSE

CONTROL VALVE

This application is a division of copending application Ser. No. 771,559 filed Oct. 29, 1968.

This invention relates to fluid pressure systems and control valves therefor and in particular to those control valves for effecting both service and emergency energization of said fluid pressure systems.

In the past fluid pressure systems, a friction device operating cylinder was provided with a service or fluid pressure responsive motor operatively connected with a friction device and selectively subjected to service fluid pressure from a source thereof to effect service energization of said friction device, and said friction device operating cylinder was also provided with an emergency or resiliently urged motor responsive to emergency fluid pressure less than a predetermined value supplied thereto from another or a protected emergency fluid pressure source to drivingly actuate said service motor and thereby mechanically effect emergency energization of said friction device. A control valve was also provided in such past systems having a service application member therein movable in response to an operator applied force to selectively apply service fluid pressure from the service source to the service motor of the friction device operating cylinder for effecting the service energization of the friction device; however, in the event of the failure of the service fluid pressure, said service application member was movable in response to the operator applied force to drivingly actuate an emergency application member provided in said control valve to isolate the emergency source and thereafter vent the emergency fluid pressure acting on the resiliently urged motor of the friction device operating cylinder to the atmosphere effecting a metered reduction thereof to a value less than the predetermined value, and said resiliently urged motor was thereafter movable to drivingly actuate said service motor to effect mechanical emergency energization of the friction device. One of the disadvantageous or undesirable features of such past systems and control valves therefor was that in the event the emergency fluid pressure in the system was reduced below the predetermined value to effect actuation of the resiliently urged motor and the resulting mechanical emergency energization of the friction device, the emergency application member of the control valve was still operable to effect partial release of said friction device. In other words, subsequent to the mechanical emergency energization of the friction device with the emergency fluid pressure less than the predetermined value, the emergency application member was movable in response to the operator controlled force thereon to a position again connecting the resiliently urged motor in pressure fluid communication with the emergency source to effect partial deactuation thereof along with the partial deenergization or release of the friction device. Another disadvantageous or undesirable feature of such past systems and control valves was that such past control valves lacked the necessary automatic characteristics for automatically isolating the emergency source from the friction device operating cylinder and thereafter venting the emergency fluid pressure acting on the resiliently urged motor of said friction device operating cylinder to the atmosphere when the emergency fluid pressure at said emergency source was reduced to a value less than the predetermined value. And another disadvantageous or undesirable feature emanating from the previously mentioned disadvantageous feature was that when a trailer relay-emergency valve, or other such related valving, was utilized in the system it could not be actuated in conjunction with such past control valves due to the lack of the necessary automatic characteristics of such past control valves for venting the emergency portion of said trailer relay-emergency valves to the atmosphere to effect the attending emergency function thereof for automatically energizing the trailer brakes.

The principal object of the present invention is to provide a novel fluid pressure system and a novel control valve therefor which overcome the aforementioned undesirable and disadvantageous features of such past systems and control valves, and this, as well as other objects and advantageous features of the present invention, will become apparent hereinafter.

Briefly, the present invention embodies a control valve having a pair of application means for effecting the application through said control valve of fluid pressure supplied thereto, one of said application means being movable relative to the other of said application means in response to an applied force toward a position isolating the supplied fluid pressure and venting the applied fluid pressure to the atmosphere, and said other application means being automatically movable relative to said one application means in response to supplied fluid pressure less than a predetermined value toward a position also isolating the supplied fluid pressure and venting the applied fluid pressure to the atmosphere. Another embodiment of the invention includes third application means movable in said control valve in response to an applied force for effecting the application therethrough of other fluid pressure, and force transmitting means engageable between said one and third application means for effecting concerted movement thereof in the event of the failure of the other fluid pressure. And further, another embodiment of the invention includes a fluid pressure system having a pair of sources for said first named and other fluid pressures and a pair of fluid pressure responsive motors operatively controlled by said one and other application means and said third application means, one of said motors being operative to effect normal energization of a friction device in response to the other fluid pressure applied thereto from said other fluid pressure source upon the actuation of said third application means, the concerted actuation of said one and third application means upon the failure of said other fluid pressure source serving to isolate said first named fluid pressure source from the other of said motors and vent the first named fluid pressure normally applied to said other motor to the atmosphere to effect actuation of said other motor and the emergency energization of said friction device, and said other motor also being actuated to effect emergency energization of said friction device in response to the automatic actuation of said other application means upon the reduction of the magnitude of the first named fluid pressure at said first named fluid pressure source to a value less than the predetermined value.

In the drawings which illustrate embodiments of the invention and wherein like numerals refer to like parts wherever they occur:

Figure 1:
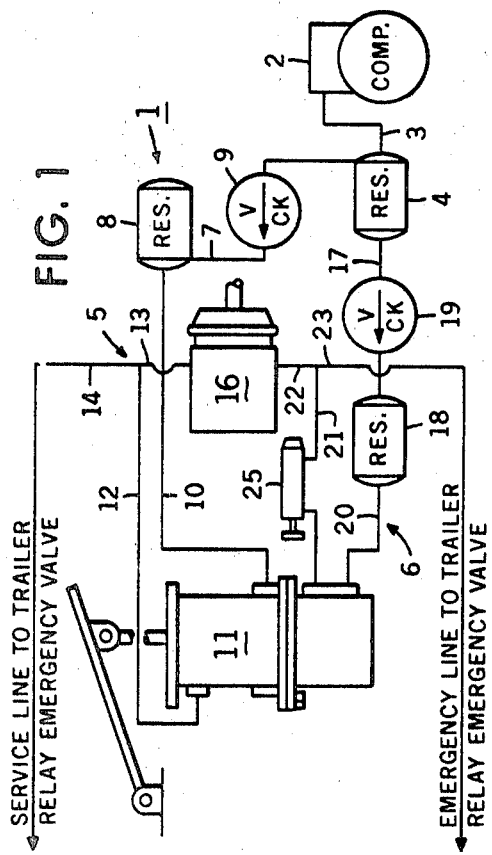
FIG. 1 is a diagrammatic view illustrating a fluid pressure system embodied in the present invention.
Figure 2:
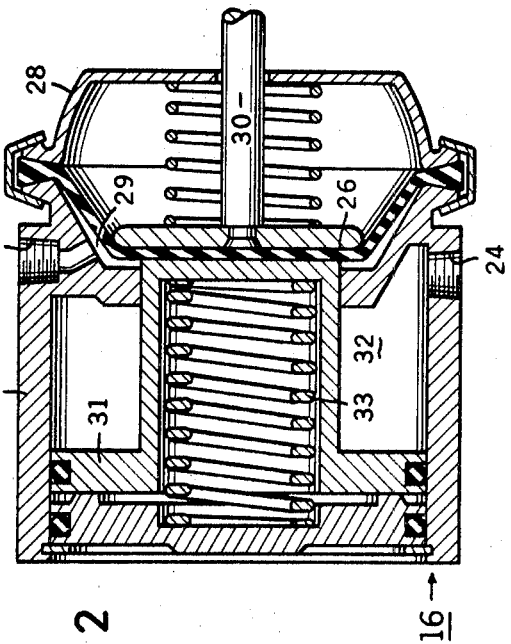
FIG. 2 is an enlarged sectional view showing the friction device operating mechanism in the system of FIG. 1 in cross section.

Referring now to the drawings in detail and in particular to FIGS. 1 and 2, a fluid pressure system 1 is provided with pressure generating means, such as a compressor 2, connected by a conduit 3 with a main or system reservoir 4, said compressor and main reservoir forming in combination a fluid pressure source, and said system is also provided with service and emergency branches indicated generally at 5,6. The service branch 5 is provided with a conduit 7 connected between the main reservoir 4 and a protected service or branch reservoir 8, and a unidirectional flow or check valve 9 is interposed in said conduit between said main and service reservoirs to protect said service reservoir against fluid pressure loss in the event of leakage or depletion of fluid pressure in said main reservoir. A conduit 10 is connected between the service reservoir 8 and a service inlet port of a control valve 11, and another conduit or service line 12 has one end connected with a service outlet port of said control valve while the other end thereof branches at 13,14 for connection with a service port 15 of a friction device operating mechanism or spring set brake cylinder 16 which is well known to the art and for connection with the service portion of a trailer relay-emergency valve (not shown)

which is also well known to the art, respectively. The emergency branch 6 is provided with a conduit 17 interposed between the main reservoir 4 and a protected emergency or branch reservoir 18, and another unidirectional flow or check valve 19 is interposed in said conduit between said main and emergency reservoirs to protect said emergency reservoir against fluid pressure loss in the event of leakage or depletion of fluid pressure in said main reservoir. A conduit 20 is connected between an emergency inlet port of the control valve 11 and the emergency reservoir 18, and another conduit 21 has one end connected with an emergency outlet port of said control valve while the other end thereof branches at 22,23 for connection with an emergency port 24 of the spring set brake cylinder 16 and for connection with the emergency line to the emergency portion of the trailer relay-emergency valve (not shown) which is well known in the art, respectively. A push-pull valve 25, also of a type well-known to the art, is interposed in the conduit 21, said push-pull valve being manually operable between a connecting position providing pressure fluid communication between the emergency outlet port of the control valve 11 and the cylinder emergency port 24 and a venting position interrupting pressure fluid communication between said emergency outlet port of said control valve and said cylinder emergency port and venting said cylinder emergency port to the atmosphere.

The brake cylinder 16 is provided with a fluid pressure responsive motor or diaphragm 26 engaged between interconnected housings 27,28 defining with the housing 27 an expansible service chamber 29, and the service port 15 which receives the service line 13, as previously mentioned, is also provided in the housing 27 connected with said service chamber. The diaphragm 26 is drivingly engaged with resiliently urged linkage or pushrod 30 which is, in turn, operatively connected with a friction device (not shown). Another fluid pressure responsive motor or stepped piston 31 is slidable in the housing 27 defining therewith an expansible emergency chamber 32 and extending into the service chamber 29 for driving mechanical engagement with the diaphragm 26 and pushrod 30. To complete the description of the system 1 and brake cylinder 16, the emergency port 24 of said brake cylinder which receives the conduit 22, as previously mentioned, is provided in the housing 27 connecting with the emergency chamber 32, and an emergency spring 33 is biased between said housing and the piston 31 urging said piston against fluid pressure expansion of the emergency chamber 32 and toward driving mechanical engagement with the diaphragm 26 and pushrod 30.

Figure 3:
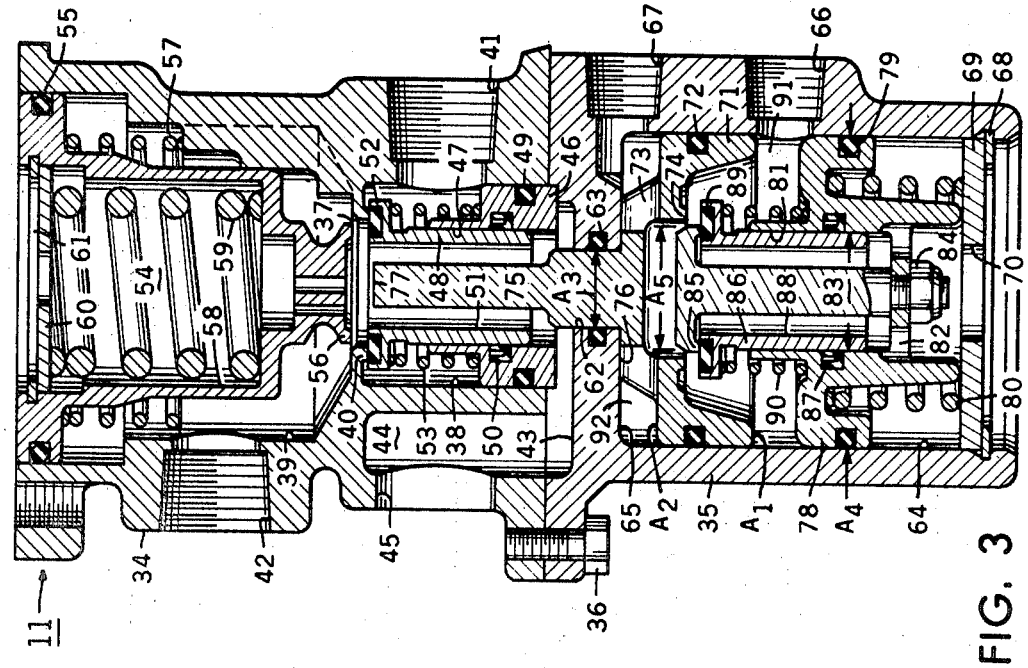
FIG. 3 is another enlarged sectional view showing the control valve of FIG. 1 also embodied in the present invention in cross section.

The control valve 11, FIG. 3, is provided with upper and lower housings 34,35 which are interconnected by suitable means, such as a plurality of studs 36. The upper housing 34 is provided with a bore 37 axially interposed between a counterbore 38 and a stepped counterbore 39 forming a set of inlet and outlet chambers, and a valve seat 40 is defined on said housing in circumscribing relation with said bore. A service inlet port 41 which receives the conduit 10, as previously mentioned, is provided in the upper housing 34 connecting with the counterbore 38, and a service outlet port 42 which receives the conduit 12, as previously mentioned, is also provided in said upper housing connecting with the counterbore 39. A recess 43 is provided in the upper end of the lower housing 35 beneath the counterbore 38 forming an exhaust chamber in combination with a communicating exhaust passage and port 44, 45 provided in the upper housing 34. A valve guide member 46 is received in the counterbore 38 in seating engagement with the upper end of the lower housing 35 having a bore 47 therethrough in which a valve element or member 48 is slidable, and seals 49,50 are carried by said valve guide member in sealing engagement with the counterbore 40 and said valve element, respectively. The valve element 48 is provided with an axial bore or exhaust opening 51 therethrough, and an annular seal or disc 52 is provided on the upper end of said valve element in circumscribing relation with said exhaust opening, said seal being normally urged into sealing engagement with the valve seat 40 by a valve spring 52 biased between said valve element and the valve guide member 46.

An application or valve control member, such as the piston 54, is slidably received in the counterbore 39 and carries a peripheral seal 55 in sealing engagement with said counterbore. The piston 54 is provided with a valve seat 56 on the lower end thereof which is substantially coaxial with the upper housing bore 37 and normally maintained in spaced relation with the valve element seal 52 by a return spring 57 biased between said piston and the housing 34. A metering spring bore 58 is provided in the piston 54, and a precompressed metering spring 59 is retained therein by a retainer or treadle force receiving plate 60 which is biased into abutment with a snap ring and groove assembly 61 provided in the upper end of said metering spring bore.

The lower housing 35 is provided with a bore 62 having a seal 63 disposed therein, and said bore is connected between the lower housing recess 43 and a counterbore 64, said bore and counterbore defining a shoulder 65 therebetween. An emergency inlet port 66 which receives the conduit 20, as previously mentioned, is provided in the lower housing 35 intersecting with the counterbore 64 adjacent to the midportion thereof, and an emergency outlet port 67 which receives the conduit 21, as previously mentioned, is also provided in said lower housing intersecting with said counterbore 64 adjacent to the shoulder 65. A snap ring and groove assembly 68 is provided adjacent to the lower end of the counterbore in displacement preventing engagement with a closure member or retainer plate 69 which is received in said counterbore defining the lower end wall thereof, and an aperture 70 which defines an exhaust port is provided in said closure member connecting with said counterbore.

An application or valve control member, such as the piston 71, is slidably received in the lower housing counterbore 64 between the inlet and outlet ports 66,67, said piston having a peripheral seal 72 in sealing engagement with said lower housing counterbore. A passage 73 is provided through the piston 71 between the inlet and outlet ports 66,67, and a valve seat 74 is provided on said piston in circumscribing relation to said passage. A pushrod or force transmitting member 75 is integrally connected with said piston and slidably received in the lower housing bore 62 in sealing engagement with the seal 63 disposed therein, said pushrod defining with said piston a shoulder 76 normally in abutting engagement with the lower housing shoulder 65, and said pushrod also having an upper end 77 for abutting driven engagement with the piston 54 and normally predeterminately spaced therefrom. It should be noted that the piston 71 is provided with opposed substantially equal effective areas $A_1$, $A_2$ substantially defined between the sealing engagement of the piston seal 72 with the lower housing counterbore 64 and the piston valve seat 74 and subjected to the fluid pressure at the inlet and outlet ports 66,67, respectively, and another area $A_3$ is also provided on the piston 71 substantially defined by the sealing engagement of the stem 75 with the seal 63, said area $A_3$ being additive to the area $A_1$ and subjected to the fluid pressure at the outlet port 67.

Another application or resiliently urged member, such as the piston 78, is slidably received in the lower housing counterbore 64 between the inlet port 66 and the closure member 69 having a peripheral seal 79 in sealing engagement with said lower housing counterbore, and a precompressed spring 80 is contained between said piston and said closure member. The piston 78 is provided with a bore 81 therein, and a plurality of passages 82 intersect with the lower end wall of said bore to connect said bore in open pressure fluid communication with the exhaust port 70. A valve seating member 83 extends coaxially through the piston bore 81 having its lower end threaded for fixed connection to the piston 78 by suitable means, such as a nut 84, while the upper end thereof defines a valve seat 85. Another valve element or member 86 is slidably received in the piston bore 81 in sealing engagement with a seal 87 disposed in said piston bore and having an exhaust passage 88 provided therethrough in pressure fluid communication with the exhaust port 70. An annular disc or seal 89 is provided on the upper end of the valve member 83 in circumscribing relation with the exhaust passage 88 for sealing engagement with both valve seats 74,85, and said seal is normally urged into sealing engagement with the valve seat 85 by a valve spring 90 biased between the piston 78 and the valve element 86. An inlet chamber 91 is provided in the lower housing counterbore 64 between the pistons 71,78 in open pressure fluid communication with the inlet port 66, and an outlet chamber 92 is also provided in said lower housing counterbore between the piston 71 and the housing shoulder 65 in open pressure fluid communication with the outlet port 67. To complete the description of the control valve 11, it should be noted that the piston 78 is provided with an effective area $A_4$ substantially defined between the sealing engagement of the seal 79 with the lower housing counterbore 64 and the piston bore 81 and subjected to the fluid pressure at the inlet port 66, and another area $A_5$ is provided on the seating member 83 substantially defined by the seating engagement of the seating member valve seat 85 with the valve element 86 and subjected to the fluid pressure at the outlet port 67.

In the operation with the push-pull valve 25 in its connecting position, fluid pressure generated by the compressor 2 flows through the conduit 3 to the main reservoir 4 and therefrom through the conduit 7, the unidirectional valve 9, the service reservoir 8 and the conduit 10 of the service branch 5 into the service inlet port and chamber 41,38 of the control valve 11. In the emergency branch 6, the fluid pressure also flows from the main reservoir 4 through the conduit 17, the unidirectional valve 19, the emergency reservoir 18 and the conduit 20 into the emergency inlet port and chamber 66,91 of the control valve 11 acting on the effective area $A_4$ of the piston 78 to establish a holding force, and when the magnitude of the emergency fluid pressure in said emergency inlet chamber exceeds a predetermined value, the holding force overcomes the compressive force of the spring 80 urging said piston toward its inoperative position into engagement with the closure member 69, as shown in FIG. 3. The fluid pressure flows from the emergency inlet chamber 91 through the passage 73 of the piston 71, the emergency outlet chamber and port 92,67, the conduits 21,22 and the push-pull valve 25 into the emergency port and chamber 24,32 of the brake cylinder 16. It should be noted that with the piston 78 in its inoperative position, the emergency fluid pressure applied to the emergency outlet port 67 also acts on the area $A_5$ of said piston establishing a supplemental force additive to the holding force to maintain said piston in its inoperative position. When the established fluid pressure in the cylinder emergency chamber 32 acting on the effective area of the stepped piston 31 therein exceeds the predetermined value, said stepped piston is urged leftwardly toward its normal or inoperative position against the emergency spring 33 to contain the compressive force thereof, as shown in FIG. 2. At the same time, the emergency fluid pressure also flows from the conduit 21 through the conduit 23 to actuate the emergency portion of the trailer relay-emergency valve, as is well known in the art.

If the operator desires to effect a service braking application under normal operating conditions, a manually applied force on the force receiving plate 60 of the control valve 11 is transmitted through the metering spring 59 to the piston 54 moving said piston downwardly against the compressive force of the return spring 57. This downward movement initially engages the piston valve seat 56 with the valve element 48 closing the exhaust passage 51 thereof and isolating the outlet chamber 39 from the atmosphere, and said downward movement thereafter urges said valve element against the valve spring 53 to a position disengaged from the upper housing valve seat 40 to establish pressure fluid communication between the inlet and outlet ports 41,42. The service fluid pressure flows in the service branch 5 from the inlet port 41 through the inlet and outlet chambers 38,39 and the connecting bore or passage 37, the outlet port 42, and the service lines 12,13 into the service port and chamber 15,29 of the brake cylinder 16. The service fluid pressure so established in the brake cylinder service chamber 29 acts on the effective area of the diaphragm 26 to create an application force which concertedly moves said diaphragm and the linkage 30 rightwardly in a direction to effect energization of the friction device (not shown) associated therewith. At the same time, the established service fluid pressure also flows from the service line 12 through the conduit 14 to actuate the service portion of the trailer relay-emergency valve, as is well known to the art.

When the reaction force created by the established fluid pressure in the control valve outlet chamber 39 acting on the effective area of the piston 54 therein equals the manually applied force, said piston is moved upwardly against the metering spring 59 to position the valve element 48 in lapped engagement with both the upper housing valve seat 40 and the piston valve seat 56. The reaction force acting through the metering spring 58 affords the operator a direct and accurate "feel" as to the extent or intensity of the braking effort or application. If a greater braking application is desired, the manually applied force is increased which results in an increased application force to further energize the friction device, as well as an increased reaction force, and the component parts of the control valve 11 function in the same manner as previously described to again move said component parts to their lapped positions.

When the desired braking effort is attained, the manually applied force is removed from the force receiving plate 60, and the return spring 57 moves the piston 54 upwardly toward its original position. Since the valve element 48 is urged by its spring 53 into lapped engagement with the upper housing valve seat 40 interrupting pressure fluid communication between the inlet and outlet ports 41,42, this upward movement of the piston 54 disengages the valve seat 56 thereof from said valve element to again open the valve element exhaust passage 51 reestablishing pressure fluid communication between the outlet and exhaust ports 42,45. In this manner, service fluid pressure is exhausted to the atmosphere from the cylinder service chamber and port 29,15 through the service lines 12,13, the control valve outlet port and chamber 42,39, the valve element exhaust passage 51, the housing recess, passage and exhaust port 43,44,45. Upon such exhaustion of the service fluid pressure from the cylinder service chamber 29, the application force is, of course, eliminated, and the diaphragm and linkage 26,30 return to their original positions effecting the deenergization of the friction device associated therewith. At the same time, the service fluid pressure is also exhausted from the service portion of the trailer relay-emergency valve to effect deactuation thereof through the conduits 14,12 and the control valve 11, as described above.

In the event of the failure of the service branch 5 with a resultant loss of the fluid pressure in the service reservoir 8 which effects emergency vehicle operating conditions, the manually applied force moves the piston 54 downwardly to actuate the valve element 48; and since it is assumed that the service branch 5 has failed effecting the emergency condition, the establishment of fluid pressure in said service branch to effect the normal service energization of the friction device and the service portion of the trailer relay-emergency valve, as previously described, is obviated. Of course, when such service energization of the friction device is not effected due to the aforementioned malfunction of the service branch, the natural instinct or tendency of the operator is to further actuate the force applying treadle or pedal, and in this manner, further downward movement of the piston 54 drivingly engages said piston with the pushrod abutment 77 to effect concerted downward movement of the piston and pushrod 71,75 therewith. This concerted downward movement of the pistons and pushrod 54,71,75 initially moves the piston valve seat 74 into seating engagement with the valve element 86 to isolate the fluid pressure at the emergency inlet port 66 from that at the emergency outlet port 67 and thereafter moves said valve element to a position disengaged from the valve seat 85 to establish metered pressure fluid communication between the emergency outlet and exhaust ports 67,70. The metered exhaustion of the fluid pressure is effected from the brake cylinder emergency chamber and port 33,24 to the atmosphere through the conduits 20,21 and the push-pull valve 25, the control valve emergency outlet port and chamber 67,92, the piston passage 73, the valve element exhaust passage 88 and the bore and passages 81,82 of the piston 78, and the emergency exhaust port 70 to the atmosphere. When the fluid pressure in the brake cylinder emergency chamber 32 acting on the effective area of the stepped piston 31 therein is reduced below the predetermined value, the compressive force of the emergency spring 33 concertedly moves said stepped piston and the diaphragm and linkage 26,30 in a rightward direction to mechanically effect energization of the friction device (not shown) under the emergency conditions. When the valve element 86 is disengaged from the valve seat 85 to effect such metered exhaustion of the emergency fluid pressure from the brake cylinder emergency chamber 32, it should be noted that the effective area $A_1$ of the piston 71 is subjected to the isolated fluid pressure at the emergency inlet port 66 and that the areas $A_2$, $A_3$ of said piston are subjected to the reduced fluid pressure at the emergency outlet port 67 to establish a differential reaction force acting across said piston which is transmitted through the pushrod 75 and the piston 54 to the metering spring 59 in opposition to the manually applied force thereon.

When the magnitude of the differential reaction force substantially equals that of the applied force, the pistons and pushrod 54,71,75 are concertedly moved upwardly against the metering spring 59 to position the valve element 86 in lapped engagement with both of the valve seats 75,85. The differential reaction force acting through the metering spring 59 against the manually applied force affords the operator a direct and accurate "feel" as to the extent or intensity of the braking effort or application under emergency conditions. If a greater braking effort is desired under emergency conditions, the manually applied force is increased which results in an increased differential reaction force wherein the component parts of the control valve 11 function in the same manner as previously described to again move said component parts to their lapped positions, and the compressive force of the emergency spring 33 is responsive to such metered exhaustion of the fluid pressure in the brake cylinder emergency chamber 32 to increase the mechanical energization of the friction device under emergency conditions, as previously described. It should also be noted that emergency fluid pressure is exhausted from the emergency portion of the trailer relay-emergency valve to effect the emergency actuation thereof, as well known in the art, through the conduits and push-pull valve 23,21,25 and the control valve 11, as previously described.

When the desired braking effort is attained under the emergency conditions, the manually applied force is removed from the piston 54 and the differential reaction force serves to move the piston 71 upwardly toward its original position. Since the valve element 86 is urged by its spring 90 into engagement with the valve seat 85 interrupting pressure fluid communication between the emergency outlet and exhaust ports 67,70, the upward movement of the piston 71 reengages the abutment 76 thereof with the housing shoulder 65 and disengages the valve seat 74 from the valve element 86 to reestablish pressure fluid communication between the emergency inlet and outlet ports 66,67, and the pushrod 75 and piston 54 are also concertedly driven upwardly toward their original positions in response to the upward movement of the piston 71. In this manner, fluid pressure again flows from the emergency inlet port 66 through the inlet and outlet chambers 91,92, the outlet port 67 and the conduits 21,22,23 to the brake cylinder emergency port and chamber 24,30 and to the emergency portion of the trailer relay-emergency valve, respectively. When the fluid pressure in the brake cylinder chamber 32 is reestablished to a value in excess of the predetermined value, the force of the reestablished fluid pressure in said chamber acting on the effective area of the stepped piston 31 therein again urges said stepped piston leftwardly toward its normal or inoperative position to contain the compressive force of the emergency spring 33, and the diaphragm and linkage 26,30 are concertedly movable with said stepped piston in the leftward direction toward their normal or inoperative positions to effect the deenergization of the friction device under emergency conditions. The reestablishment of the emergency fluid pressure to a magnitude in excess of the predetermined value is also effective through the conduit 23 to deactuate the emergency portion of the trailer relay-emergency valve.

In the event of a failure in the emergency branch 6 with the resultant reduction of the emergency fluid pressure in the emergency reservoir 18 to a value less than the predetermined value, the holding and supplemental forces of the reduced emergency fluid pressure acting on the effective areas $A_4$, $A_5$ of the piston 78 are correspondingly reduced, and the compressive force of the spring 80 overcomes such reduced holding and supplemental forces to effect automatic movement of said piston 78 upwardly in the lower housing counterbore 64 toward its operative position. This upward movement of the piston 78 initially engages the valve element 86 with the valve seat 74 of the piston 71 isolating the reduced emergency fluid pressure at the emergency inlet port 66 from that at the emergency outlet port 67 and thereafter disengages the valve seat 85 from said valve element to automatically establish open pressure fluid communication between said emergency outlet port and the emergency exhaust port 70 which, of course, eliminates the supplemental force. In this manner, the emergency fluid pressure is simultaneously and automatically exhausted from the emergency portion of the trailer relay-emergency valve and the emergency chamber 30 of the brake cylinder 16 through the conduits 21,22, 23 and the push-pull valve 25, the control valve emergency outlet port and chamber 67,92, the passage 73 of the piston 71, the valve element exhaust passage 88, the bore and passages 81, 82 of the piston 78, and the exhaust port 70 to the atmosphere. Of course, such exhaustion of the emergency fluid pressure from the brake cylinder 16 effects the mechanical function thereof to mechanically energize the friction device connected therewith and also effects the emergency function of the emergency portion of the trailer relay-emergency valve, as previously mentioned.

It should be noted that the control valve 11 is provided with a "nonreleasing" feature which is effective to prevent the partial release of the friction device upon manual actuation of said control valve under the emergency operating conditions created by the failure of the emergency fluid pressure to a value less than the predetermined value. For instance, when the emergency fluid pressure is reduced to a value less than the predetermined value and the piston 78 is in its operative position urging the valve element 88 into engagement with the valve seat 74 and disengaging the valve seat 85 from said valve element to automatically effect open pressure fluid communication between the emergency outlet and exhaust ports 67,70, as described above, the concerted manual actuation of the pistons and pushrod 54,71, 75 in response to an applied force merely serves to further disengage said valve element from the valve seat 85. Further, the abutting engagement of the piston abutment surface 76 with the housing shoulder 65 obviates relative movement of the piston 71 upwardly with respect to the piston 78 in its operative position thereby obviating the possibility of reestablishing pressure fluid communication between the emergency inlet and outlet ports 66,67 when the emergency fluid pressure is less than the predetermined value; therefore, it is obvious that emergency fluid pressure cannot be applied to the brake cylinder 16 to effect a partial release of the stepped piston 31 and the attendant partial release of the friction device.

If the operator desires to park the vehicle with the system 1 functioning under normal operating conditions, the push-pull valve 25 is manually moved from its connecting position to its venting position interrupting pressure fluid communication through the conduit 21 between the emergency outlet port 67 of the control valve 11 and the brake cylinder emergency port 24 and venting said brake cylinder emergency port to the atmosphere. In this manner, the emergency fluid pressure in the emergency portion of the trailer relay-emergency valve and in the brake cylinder emergency chamber 30 is "dumped" to atmosphere through conduits 21,22, 23 and the push-pull valve 25 to effect simulated emergency actuation of the trailer relay-emergency valve and the brake cylinder 16, as previously described.

The embodiments of the invention in which an exclusive property or privilege is claimed are defined as follows.

I claim:

1. A fluid pressure system for a friction device comprising first means responsive to a first fluid pressure applied thereto for energizing said friction device, second means responsive to a second fluid pressure applied thereto less than a predetermined value for energizing said friction device, resiliently urged means for controlling the application of the second fluid pressure to said second means, said resiliently urged means being responsive to the second fluid pressure less than the predetermined value to vent the second fluid pressure applied to said second means to atmosphere and actuate said second means, fourth means for venting the second fluid pressure applied to said second means to the atmosphere to effect actuation of said second means, and fifth means for normally applying fluid pressure to said first means and for subjecting said fourth means to an applied force to effect actuation thereof in the event of a failure of one of said first and second fluid pressures.

2. A fluid pressure system for a friction device comprising a pair of fluid pressure sources, first means responsive to fluid pressure applied thereto from one of said sources for energizing said friction device, second means responsive to fluid pressure applied thereto less than a predetermined value from the other of said sources for energizing said friction device, resiliently urged means for controlling the application of the fluid pressure from said other source to said second means, said resiliently urged means being movable toward a venting position in response to the reduction of the fluid pressure at said other source to a value less than the predetermined value to vent the fluid pressure applied to said second means to the atmosphere and effect actuation of said second means to energize said friction device, fourth means movable toward a venting position in response to an applied force thereon for venting the fluid pressure applied to said second means to the atmosphere to effect actuation of said second means and energize said friction device upon the failure of the fluid pressure at one of said one and other sources, and valve means controlling communication between the fluid pressure applied to said second means and the atmosphere, said valve means being actuated by said resiliently urged means and said fourth means upon movement thereof to their respective venting positions to vent the fluid pressure applied to said second means to the atmosphere.

3. A fluid pressure system for effecting normal and mechanical energization of a friction device comprising a pair of fluid pressure sources, a fluid pressure responsive motor actuated in response to fluid pressure applied thereto from one of said sources to effect normal energization of said friction device, a resiliently urged motor actuated in response to fluid pressure applied thereto less than a predetermined value from the other of said sources to effect the mechanical energization of said friction device, means movable in response to an applied force for applying fluid pressure from said one source to said fluid pressure responsive motor to effect actuation thereof and the normal energization of said friction device, other means responsive to the applied force movement of said first named means in excess of a predetermined value to isolate said other fluid pressure source and vent the applied fluid pressure from said resiliently urged motor to the atmosphere, said resiliently urged motor being actuated upon the reduction of the fluid pressure applied thereto to a value less than the predetermined value to mechanically energize said friction device, and resiliently urged means urged toward a position in response to the fluid pressure at said other source in excess of the predetermined value to permit communication between said other source and resiliently urged motor, said resiliently urged means being movable to interrupt communication between said other source and said resiliently urged motor and vent the applied fluid pressure from said resiliently urged motor to the atmosphere to effect actuation thereof and the mechanical energization of said friction device upon the reduction of the fluid pressure at said other source to a value less than the predetermined value.

4. A fluid pressure system for energizing a friction device comprising a fluid pressure source, a resiliently urged motor actuated in response to fluid pressure applied thereto less than a predetermined value from said source to effect energization of said friction device, movable means for controlling the application of fluid pressure from said source to said resiliently urged motor, said movable means being movable in response to an applied force toward a venting position to isolate said source and vent the applied fluid pressure from said resiliently urged motor to the atmosphere, said resiliently urged motor being actuated upon the reduction of the applied fluid pressure to a value less than the predetermined value to energize said friction device, resiliently urged means for controlling pressure fluid communication between said source and said resiliently urged motor and normally urged toward a position establishing pressure fluid communication between said source and said resiliently urged motor in response to fluid pressure at said source in excess of the predetermined value, said resiliently urged means being movable toward a venting position to isolate said source and vent the applied fluid pressure from said resiliently urged motor to the atmosphere to actuate said resiliently urged motor and energize said friction device in the event of the reduction of the fluid pressure at said source to a value less than the predetermined value, and valve means urged toward a closed position isolating the fluid pressure applied to said resiliently urged motor from the atmosphere, said valve means being actuated by said resiliently urged means and said movable means to an open position venting the fluid pressure applied to said resiliently urged motor to the atmosphere upon the movement of said resiliently urged means and said movable means to their venting positions, respectively.

5. A fluid pressure system for energizing a friction device comprising a fluid pressure source, a resiliently urged motor actuated in response to fluid pressure applied thereto less than a predetermined value from said source to effect energization of said friction device, and control means including a housing having a pressure fluid flow passage therein connected between said source and said resiliently urged motor, a pair of application means movable in said housing and controlling the application of fluid pressure through said flow passage, one of said application means being normally urged toward a position in said flow passage permitting the application therethrough of the fluid pressure from said source to said resiliently urged motor in response to fluid pressure at said source in excess of a predetermined value acting on said one application means, and resilient means opposing movement of said one application means to its flow passing position, said resilient means urging said one application means toward another position in said flow passage isolating said source from said resiliently urged motor and venting the applied fluid pressure therefrom to the atmosphere to actuate said resiliently urged motor and energize said friction device when the fluid pressure at said source acting on said one application means is reduced to a value less than the predetermined value, the other of said application means being movable in response to an applied force toward a position in said flow passage isolating said source from said resiliently urged motor and venting the applied fluid pressure therefrom to the atmosphere to actuate said resiliently urged motor and energize said friction device only when said one application means is in its fluid pressure passing position, and means for subjecting said other application means to the applied force to effect actuation thereof.

6. A fluid pressure system for energizing a friction device comprising a pair of fluid pressure sources, a fluid pressure responsive motor for energizing said friction device, means movable in response to an applied force for normally applying fluid pressure from one of said sources to said motor to effect energization of said friction device, a resiliently urged motor actuated in response to fluid pressure applied thereto less than a predetermined value from the other of said sources for energizing said friction device, control means including a pair of relatively movable application means for controlling the application of fluid pressure from said other source to said resiliently urged motor, said application means each being respectively movable relative to each other from their respective inoperative positions toward their operative positions to isolate the fluid pressure at said other source from the fluid pressure applied to said resiliently urged motor and vent the applied fluid pressure from said resiliently urged motor to the atmosphere, one of said application means being automatically actuated toward its operative position when the fluid pressure at said other source acting thereon is less than the predetermined value, and other means responsive to the movement of said first named means in excess of a predetermined amount for transmitting the applied force from said first named means to the other of said application means to effect movement thereof into its operative position when said one application means is in its inoperative position.

7. A fluid pressure system according to claim 6, wherein said one application means includes resiliently urged means, said resiliently urged means being urged against its own force toward its inoperative position in response to the fluid pressure in excess of the predetermined value at said other source acting thereon and being movable by its own force to its operative position upon the reduction of the fluid pressure at said other source to a value less than the predetermined value.

8. A fluid pressure system according to claim 7, comprising an area on said resiliently urged means subjected to the fluid pressure at said other source, said resiliently urged means being movable against its own force to its inoperative position in response to the fluid pressure in excess of the predetermined value at said other source acting on said area and being movable by its own force to its operative position upon the reduction of the fluid pressure at said other source acting on said area to a value less than the predetermined value.

9. A fluid pressure system according to claim 7, comprising valve means movable in said resiliently urged means for engagement with said other application means and controlling pressure fluid communication between said other source and resiliently urged motor and between said resiliently urged motor and the atmosphere, said other application means being movable in response to the applied force thereon to its operative position to engage and move said valve means toward a position interrupting pressure fluid communication between said other source and said resiliently urged motor and establishing pressure fluid communication between said resiliently urged motor and the atmosphere when said resiliently urged means is in its operative position, and said resiliently urged means being initially movable toward its operative position to engage said valve means with said other application means interrupting pressure fluid communication between said other source and said resiliently urged motor and thereafter further movable relative to said valve means to establish communication between said resiliently urged motor and the atmosphere.

10. A fluid pressure system according to claim 9, comprising a valve seat in said other application means for engagement with said valve means, said valve seat being engaged with said valve means to interrupt pressure fluid communication between said other source and said resiliently urged motor.

11. A fluid pressure system according to claim 9, comprising a valve seat on said resiliently urged means, said valve means being normally urged into engagement with valve seat to interrupt communication between said resiliently urged motor and the atmosphere, and said valve means being disengaged from said valve seat to establish communication between said resiliently urged motor and the atmosphere upon upon the applied force movement of said other application means to its operative position and upon the movement of said resiliently urged means to its operative position.